(12) United States Patent
Jackson

(10) Patent No.: US 7,912,963 B2
(45) Date of Patent: Mar. 22, 2011

(54) METHODS AND APPARATUS TO CONTROL A VOICE EXTENSIBLE MARKUP LANGUAGE (VXML) SESSION

(75) Inventor: James Jackson, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 450 days.

(21) Appl. No.: 11/770,297

(22) Filed: Jun. 28, 2007

(65) Prior Publication Data

US 2009/0003380 A1 Jan. 1, 2009

(51) Int. Cl.
*G06F 15/16* (2006.01)

(52) U.S. Cl. ...................................... 709/227; 379/67.1

(58) Field of Classification Search .................. 709/204, 709/206, 219, 227
See application file for complete search history.

(56) References Cited

U.S. PATENT DOCUMENTS

| | | | |
|---|---|---|---|
| 6,901,431 B1 | 5/2005 | Dodrill et al. | |
| 7,061,928 B2 | 6/2006 | Giroti et al. | |
| 7,170,979 B1 | 1/2007 | Byrne et al. | |
| 7,185,094 B2 | 2/2007 | Marquette et al. | |
| 7,203,907 B2 | 4/2007 | Weng et al. | |
| 7,231,636 B1 * | 6/2007 | Evans ........................... | 717/127 |
| 2002/0146108 A1 * | 10/2002 | Weissman et al. ........ | 379/221.06 |
| 2002/0176404 A1 * | 11/2002 | Girard ............................ | 370/352 |
| 2003/0051037 A1 * | 3/2003 | Sundaram et al. ............ | 709/227 |
| 2003/0231747 A1 | 12/2003 | Creamer et al. | |
| 2004/0258238 A1 | 12/2004 | Wong | |
| 2005/0021826 A1 | 1/2005 | Kumar | |
| 2005/0069102 A1 | 3/2005 | Chang | |
| 2006/0083362 A1 | 4/2006 | Anisimov et al. | |
| 2006/0203975 A1 | 9/2006 | Erhart et al. | |
| 2006/0203978 A1 | 9/2006 | Erhart et al. | |
| 2006/0239249 A1 | 10/2006 | Banner et al. | |
| 2006/0239257 A1 | 10/2006 | Banner et al. | |
| 2007/0025340 A1 | 2/2007 | Bettis et al. | |
| 2007/0081520 A1 * | 4/2007 | Da Palma et al. ............. | 370/352 |
| 2007/0150902 A1 * | 6/2007 | Meyer et al. ................... | 719/313 |
| 2007/0294345 A1 * | 12/2007 | Bangalore et al. ............ | 709/204 |
| 2008/0086566 A1 * | 4/2008 | Kumarasamy et al. ........ | 709/227 |
| 2008/0208584 A1 * | 8/2008 | Ativanichayaphong et al. ................................ | 704/260 |

OTHER PUBLICATIONS

Burke et al. "SIP Interface to VoiceXML Media Services." IETF, Nov. 18, 2006, pp. 1-45.*
Rosenberg et al. "A SIP Interface to VoiceXML Dialog Servers." IETF, Jul. 13, 2001, pp. 1-16.*
Sparks, R. "RFC 3515: The Session Initiation Protocol (SIP) Refer Method." IETF Network Working Group, Apr. 2003, pp. 1-23.*
Rosenberg et al. "Third Party Call Control in SIP." IETF, Nov. 22, 2000, pp. 1-15.*

(Continued)

*Primary Examiner* — Hassan Phillips
*Assistant Examiner* — Christopher D Biagini
(74) *Attorney, Agent, or Firm* — Hanley, Flight & Zimmerman, LLC

(57) ABSTRACT

Methods and apparatus to control a voice eXtensible Markup Language (VXML) session are disclosed. An example application server comprises an interface to send a first protocol message to a media server to initiate a communication session to provide first VXML content to the media server, and a session controller to detect an event at the application server and to direct the interface to send a second protocol message to the media server to interrupt the first VXML content at the media server and to direct the media server to obtain second VXML content via the communication session.

16 Claims, 5 Drawing Sheets

OTHER PUBLICATIONS

Singh et al. "Integrating VoiceXML with SIP services", ICC 2003—Global Services and Infrastructure for Next Generation Networks, Anchorage, Alaska, May 2003, pp. 1-5.*

David Burke and Darragh O'Flanagan, "An IMS Application Example Based on SIP Servlets and VoiceXML", Jun. 13, 2006, downloaded from http://dev2dev.bea.com/lpt/a/513, 14 pages.

* cited by examiner

METHODS AND APPARATUS TO CONTROL A VOICE EXTENSIBLE MARKUP LANGUAGE (VXML) SESSION

FIELD OF THE DISCLOSURE

This disclosure relates generally to voice eXtensible Markup Language (VXML) sessions and, more particularly, to methods and apparatus to control a VXML session.

BACKGROUND

Many voice over Internet protocol (VoIP) applications are implemented using a combination of session initiated protocol (SIP) and voice eXtensible Markup Language (VXML). VXML is a mark-up based programming language defined by the World Wide Web Consortium (W3C), and designed for creating audio dialogs that feature synthesized speech, digitized audio, recognition of spoken and dual-tone multiple frequency (DTMF) key input, recording of spoken input, telephony, and/or mixed initiative conversations. One of the goals of VXML is to bring the advantages of Web-based development and/or content delivery to interactive voice applications. A common SIP/VXML architecture for implementing VoIP applications utilizes application servers (that implement VXML servers) and media servers (that implement VXML clients). A media server (e.g., a VXML client) requests and obtains VXML content and/or data from an application server (e.g., a VXML server) using a hyper-text transfer protocol (HTTP) communication session. The media server then executes the obtained VXML content and/or data including, in some instances, requesting, obtaining and/or executing additional VXML content and/or data.

DETAILED DESCRIPTION

Methods and apparatus to control a voice eXtensible Markup Language (VXML) session are disclosed. A disclosed example method includes detecting an occurrence of an event at an application server, and sending a protocol message to a media server to interrupt execution of first voice eXtensible Markup Language (VXML) content at the media server and to direct the media server to request second VXML content from the application server.

A disclosed example application server includes an interface to send a first protocol message to a media server to initiate a communication session to provide first VXML content to the media server, and a session controller to detect an event at the application server and to direct the interface to send a second protocol message to the media server to interrupt the first VXML content at the media server and to direct the media server to obtain second VXML content via the communication session.

A disclosed example media server includes an interface to receive a protocol message from an application server, and a voice eXtensible Markup Language (VXML) client to obtain first VXML content from the application server, the VXML client to interrupt execution of the first VXML content and to obtain second VXML content from the application server in response to the protocol message.

Another disclosed example method includes receiving a protocol message from an application server, and interrupting execution of first voice eXtensible Markup Language (VXML) content and requesting second VXML content from the application server in response to the protocol message.

In the interest of brevity and clarity, throughout the following disclosure references will be made to the example Internet protocol (IP) Multimedia subsystem (IMS) based voice over IP (VoIP) communication system of FIG. 1. Moreover, the following disclosure will utilize session initiation protocol (SIP) messages and/or SIP-based message exchanges. However, it should be understood that the methods and apparatus described herein to provide call associated content services are applicable to other VoIP communication systems and/or networks (e.g., networks based on soft switches), VoIP devices, IMS devices, application servers, media servers, tElephone NUMber mapping (ENUM) servers, border elements, access networks, IP networks, IMS networks and/or IMS communication systems, and/or other types of protocols, messages, and/or message exchanges.

Figure 1:
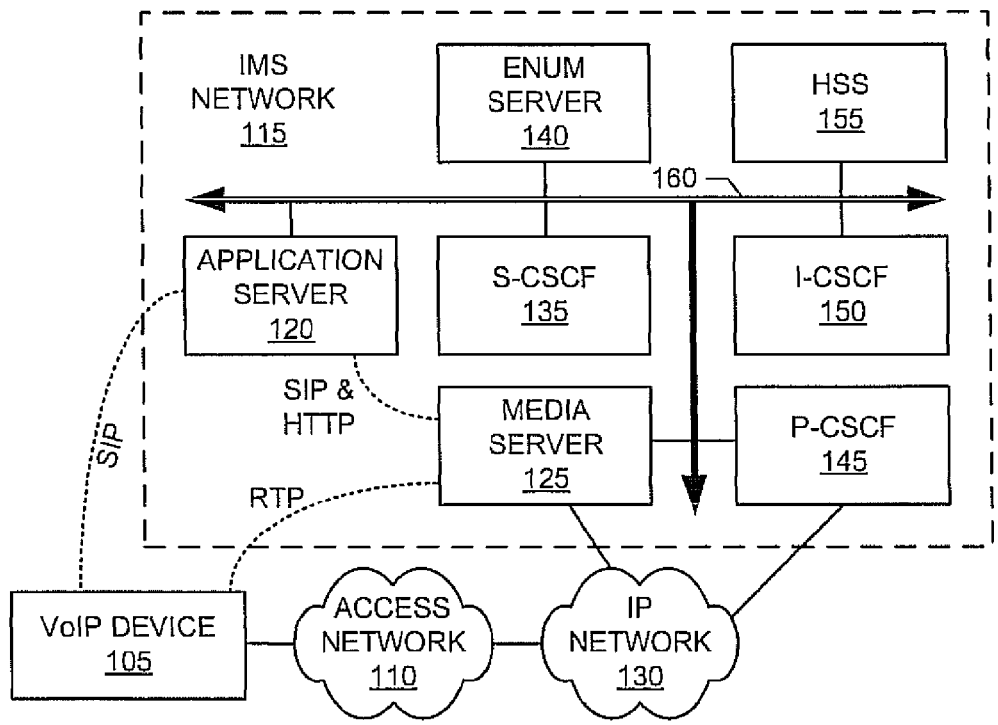
FIG. 1 is a schematic illustration of an example Internet Protocol (IP) Multimedia Subsystem (IMS) based voice over IP (VoIP) communication system constructed in accordance with the teachings of the disclosure.

FIG. 1 is a schematic illustration of an example IMS-based VoIP communication system that includes any number and/or type(s) of VoIP user devices, one of which is designated at reference numeral 105. Example VoIP user devices 105 include, but are not limited to, an IMS (e.g., VoIP) phone, a VoIP residential gateway, a VoIP enabled personal computer (PC), a VoIP endpoint, a wireless VoIP device (e.g., a wireless-fidelity (WiFi) Internet protocol (IP) phone), a VoIP adapter (e.g., an analog telephone adapter (ATA)), a VoIP enabled personal digital assistant (PDA), and/or a VoIP kiosk. The example VoIP device 105 of FIG. 1 may be implemented and/or be found at any number and/or type(s) of locations. Further, the VoIP device 105 may be a fixed location device, a substantially fixed location device and/or a mobile device. Moreover, the VoIP device 105 may have equipment communicatively and/or electrically coupled to it. For example, a VoIP ATA may be coupled to a telephone, and/or a VoIP residential gateway may be coupled to a PC and/or set-top box.

To access IMS communication services throughout and/or within a site, location, building, geographic area and/or geographic region, the example IMS communication system of FIG. 1 includes any number and/or type(s) of access networks, one of which is designated in FIG. 1 with reference number 110. In general, the example access network 110 provides and/or facilitates a communicative coupling of the VoIP user device 105 to and/or with an IMS network 115. The IMS network 115 provides and/or enables IMS communication services (e.g., telephone services, Internet services, data services, messaging services, instant messaging services, electronic mail (email) services, chat services, video services, audio services, gaming services, voicemail, facsimile services, etc.) to the VoIP device 105. However, in some examples, a VoIP device 105 may access the IMS network 115 without use of an access network 110. The example access network 110 can be implemented using any number and/or type(s) of past, present and/or future standards, specifications, communication devices, networks, technologies and/or systems, such as public switched telephone network (PSTN) systems, public land mobile network (PLMN) systems (e.g., cellular), wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, power-line broadcast systems, fiber optic networks, and/or any combination and/or hybrid of these devices, systems and/or networks.

While in the illustrated example of FIG. 1, the example VoIP device 105 is depicted as having an associated access network 110, such a depiction is merely illustrative. For example, a VoIP device 105 may be configured and/or capable to utilize more than one access network 110 at the same and/or different times, a VoIP device 105 may be configured to access the IMS network 115 directly and/or via an IP network without an intervening access network 110, etc.

To provide VoIP and/or IMS communication sessions and/or services, the example IMS based VoIP communication system of FIG. 1 includes one or more IMS networks, one of which is designated in FIG. 1 with reference numeral 115. As described more fully below in connection with FIG. 5, the example IMS network 115 of FIG. 1 implements VoIP applications (e.g., voice activation applications, interactive voice response (IVR) applications, blind call transfers, supervised call transfers, etc.) based on SIP and voice eXtensible Markup Language (VXML).

To provide and/or implement VoIP applications, the example IMS network 115 of FIG. 1 includes one or more application servers (one of which is designated at reference numeral 120), and one or more media servers (one of which is designated at reference numeral 125). Application servers are sometimes referred to as feature servers. In addition to VoIP and/or IMS functions and/or services (e.g., call barring, calling name delivery and/or blocking, call blocking, call forward, call busy transfer, call screening, call forking, call trace, voicemail, announcement servers, call trees, etc.), the example application server 120 of FIG. 1 includes and/or implements a VXML server to provide VXML content and/or pages (e.g., VXML code, scripts, instructions and/or data) to the example media server 125 to execute (e.g., carry out). By executing one or more VXML pages, the example media server 125 of FIG. 1 implements a particular VoIP application and/or VXML session (e.g., a particular voice dialog session) for a VoIP user device 105. In an example scenario, a user of the VoIP device 105 initiates a telephone call to a destination (not shown) that does not respond (e.g., does not answer). Because the destination did not answer, the example IMS network 115 of FIG. 1 redirects the requested communication session to the example application server 120. Alternatively, the telephone call may originally have been directed to the application server 120. The example application server 120 of FIG. 1, in turns, directs the example media server 125 to download and execute VXML content of interest. For example, executing the VXML content may cause an audio message prompting the user to speak their name to play, and the name spoken by the user to be recorded. An example manner of implementing the example application server 120 of FIG. 1 is described below in connection with FIG. 2. An example manner of implementing the example media server 125 of FIG. 1 is described below in connection with FIG. 3.

As described more fully below in connection with FIG. 5, the example application server 120 of FIG. 1 is able to interrupt the execution of VXML content while it is being executed by the example media server 125. To interrupt VXML content execution, the example application server 120 sends a SIP REFER message to the media server 125 that is executing the VXML page. An example SIP REFER message includes a hyper-text transfer protocol (HTTP) uniform resource identifier (URI) for a replacement VXML page that the media server 125 is to obtain from the application server 120 and then begin executing. The example SIP REFER message also includes a "REFRESH" parameter and/or field that indicates to the media server 125 that the identified and/or specified replacement VXML page is to be executed instead of the currently executing VXML page. An example data structure that may be used to implement a SIP REFER message to interrupt the execution of VXML content is described below in connection with FIG. 4.

In an example scenario, the application server 120 directs (e.g., by sending a SIP INVITE message to the media server 125) the media server 125 to execute first VXML content that provides music-on-hold to the VoIP device 105 while the application server 120 and/or the IMS network 115 performs a call transfer (supervised and/or blind) to a destination (e.g., a destination selected via a VXML session and/or automatically selected by the application server 120). Once the call transfer has completed, the application server 120 interrupts the execution of the first VXML content by the media server 120 (e.g., by sending a SIP REFER message to the media server 120). In response to the interruption, the media server 125 obtains and then executes second VXML content from the application server 125 that causes and/or directs the VoIP device 105 to become communicatively coupled to the destination, thereby ending the voice dialog session (e.g., VoIP applications) between the VoIP device 105, the media server 125 and the application server 120. The example media server 125 of FIG. 1 may also request, obtain and/or execute VXML content based upon an event and/or condition (e.g., a user input received at the media server 125) that occurs at and/or is detected by and/or at the media server 125.

In contrast, traditional application servers cannot interrupt the execution of VXML content by a media server. Instead, VXML content provided by a traditional application server must include instructions that, for example, cause and/or direct the media server to periodically refresh VXML content to allow the application server an opportunity to direct the media server to different VXML content. However, such refresh operations are inherently burdensome on the communication resources of the IMS network 115 and/or limit the types of voice dialog sessions (e.g., VoIP applications) that can be implemented. For at least these reasons, the example application server 120 and/or the example media server 125 implement methods and/or apparatus that facilitate more robust and/or flexible control of VXML sessions while simultaneously reducing the communication resources required to provide enhanced VXML sessions.

As illustrated in FIG. 1, the example application server 120 and the example media server 125 exchange control and/or signaling data and/or information using SIP protocol messages (e.g., a SIP INVITE message and/or a SIP REFER message), and use HTTP to transfer VXML content. Audio data (e.g., audio prompts, synthesized speech, spoken words, dual-tone multiple-frequency (DTMF) signals) are exchanged between the VoIP device 105 and the media server 125 using a real-time protocol (RTP) communication session. The example VoIP user device 105 and the application server 120 exchange control and/or signaling information via SIP protocol messages. The example SIP, HTTP and RTP communications illustrated in FIG. 1 do not necessary flow directly between the VoIP device 105, the application server 120 and/or the media server 125. Instead, for example, SIP protocol messages exchanged by the VoIP device 105 and the application server 120 pass through one or more of the example access network 110, an IP network 130, and/or one or more servers (e.g., a proxy call session control function (P-CSCF) server 145).

In the example IMS communication system of FIG. 1, the example VoIP device 105 is communicatively coupled to the example IMS network 115 via the example access network 110, and/or any number and/or type(s) of private and/or public IP based communication networks such as, for example, the Internet, one of which is illustrated in FIG. 1 with reference numeral 130. While in the illustrated example of FIG. 1, the example VoIP device 105 is depicted as having an associated IP network 130 such a depiction is merely illustrative. For example, the example VoIP device 105 may be configured and/or capable to utilize more than one IP network 130 at the same and/or different times, etc. In general, the example IP network 130 of FIG. 1 provides and/or facilitates a communicative coupling of the VoIP device 105 to and/or with the IMS network 115.

In some examples, the VoIP device 105 may be communicatively coupled to the access network 110 via one or more additional IP based networks and/or devices (not shown), such as a local area network (LAN), a gateway and/or a router located within a place of business, a school and/or a residence. The example VoIP device 105 of FIG. 1 is communicatively coupled to the example access network 110, the example IP network 130 and/or, more generally, the example IMS network 115 via any number and/or type(s) of past, current and/or future communication network(s), communication system(s), communication device(s), transmission path(s), protocol(s), technique(s), specification(s) and/or standard(s). For instance, the example VoIP device 105 may be coupled to the example access network 110, the example IP network 130, and/or the example IMS network 115 via any type(s) of voice-band modem(s), digital subscriber line (DSL) modem(s), cable modem(s), Ethernet transceiver(s), optical transceiver(s), IP virtual private network (VPN) connection(s), Institute of Electrical and Electronics Engineers (IEEE) 802.11x (a.k.a. WiFi) transceiver(s), IEEE 802.16 (a.k.a. WiMax), wireless local area network (WLAN) access point(s), general packet radio services (GPRS) networks in 3G wireless networks, etc. Moreover, any or all of the example IMS network 115, the example access network 110, and/or the example IP network 130 of FIG. 1 may extend geographically to include one or more locations near to and/ or encompassing one or more of the VoIP devices 105. For example, the access network 110 may include a wireless access point (not shown) by which, for example, a WiFi IP phone 105 connects to the IP network 130 and the IMS network 115.

In the example IMS communication system of FIG. 1, the example access network 110, the example IP network 130, and the IMS network 115 need not be owned, implemented, and/or operated by a single service provider. For example, the VoIP device 105 may access IMS services provided by an IMS network 115 that is owned, operated and/or implemented by a first service provider via an access network 110, which is owned, operated and/or implemented by a different service provider. However, any or all of the access network 110, the IMS network 115 and/or the IP network 130 may be operated by the same service provider.

In the illustrated example IMS communication system of FIG. 1, each VoIP device (e.g., the example VoIP device 105) that is registered to the example IMS network 115 is associated with and/or assigned to a serving call session control function (S-CSCF) server (one of which is designated in FIG. 1 with reference numeral 135). The example S-CSCF server 135 of FIG. 1 is responsible for handling incoming and/or outgoing IMS (e.g., VoIP) communication sessions (e.g., telephone calls, and/or data and/or video sessions) associated with its registered VoIP devices.

While one S-CSCF server 135 is illustrated in FIG. 1, the IMS network 115 may include any number and/or type(s) of S-CSCF servers, and each such S-CSCF server may support any number and/or type(s) of VoIP devices. The example S-CSCF server 135 of FIG. 1 performs session control, maintains session states and/or enables communications with call feature servers (e.g., the example feature servers 150 of FIG. 1) for its associated and/or registered VoIP devices. For instance, when a VoIP device 105 initiates, for example, an outgoing telephone call, a communication session initiation message (e.g., a SIP INVITE message) is routed by the IMS network 115 from the VoIP device 105 to the S-CSCF server 135 associated with that particular VoIP device 105. The example S-CSCF server 135 also enables communication with application servers (e.g., the example application server 120) for its associated and/or registered VoIP devices 105.

To locate and/or identify the VoIP device and/or endpoint (e.g., the example content server 120) associated with a called party (e.g., a called telephone number), the example IMS network 115 of FIG. 1 includes any number of ENUM servers, one of which is designated in FIG. 1 with reference numeral 140. Based upon an ENUM query request message received from a S-CSCF server (e.g., the example S-CSCF server 135), the example ENUM server 140 of FIG. 1 performs an ENUM database lookup to identify one or more uniform resource identifiers (URIs) (e.g., a SIP URI, an HTTP URI, etc.) for a called party identifier (e.g., E.164 telephone numbers).

In response to the communication session initiation message, the example S-CSCF server 135 sends an ENUM query request message to an ENUM server (e.g., the example ENUM server 140) to obtain an identifier (e.g., a SIP URI) for the called party (e.g., the example application server 120). The URI obtained from the example ENUM server 140 is used by the S-CSCF server 135 to establish the requested communication session.

To provide an access entry point for a VoIP device (e.g., the example VoIP device 105) into the IMS network 115, the example IMS network 115 of FIG. 1 includes any number and/or type(s) of P-CSCF servers, one of which is designated in FIG. 1 with reference numeral 145. The example P-CSCF server 145 of FIG. 1, among other things, routes SIP messages between VoIP devices and their associated S-CSCF server(s).

To locate and/or identify the S-CSCF server (e.g., the example S-CSCF server 135) associated with a VoIP device, the example IMS network 115 of FIG. 1 includes any number and/or type(s) of interrogating call session control function (I-CSCF) servers, one of which is designated in FIG. 1 with reference number 150. The example I-CSCF server 150 of FIG. 1 serves as a contact point within the example IMS network 115 for connections destined for a VoIP device 105 of the IMS communication system, and/or for a VoIP device 105 currently located within the serving area of the IMS network 115 (e.g., a roaming subscriber). For example, for a destination identified by the example ENUM server 140, the example I-CSCF server 150 identifies to which S-CSCF server 135 the final destination VoIP device 105 is registered. IMS protocol messages (e.g., SIP messages) directed to the destination VoIP device 105 are then routed to the S-CSCF server 135 identified by the I-CSCF 150. If a destination identified by the ENUM server 140 is associated with a device not associated with the IMS network 115 (e.g., a public switched telephone network (PSTN) device, a public land mobile network (PLMN) device and/or a VoIP device served by a different IMS and/or VoIP network), protocol messages directed to the destination are routed to an appropriate border element (e.g., a media gateway, a peered border element, etc.) (not shown).

To manage subscriber information, and/or to enable subscribers and/or servers to locate other servers, subscribers and/or destinations, the example IMS network 115 of FIG. 1 includes any number and/or type(s) of home subscriber server (s) (HSSs), one of which is designated in FIG. 1 with reference numeral 155. The example HSS 155 of FIG. 1 maintains a device profile and/or one or more preferences for each subscriber and/or VoIP device 105 of the IMS network 115. The example I-CSCF server 150 of FIG. 1 uses information contained in the HSS 155 to, for example, determine and/or locate the S-CSCF server 135 associated with a particular subscriber and/or VoIP device 105.

As illustrated in FIG. 1, the example application server 120, the example media server 125, the example S-CSCF server 135, the example ENUM server 140, the example P-CSCF server 145, the example I-CSCF server 150 and/or the example HSS 155 communicate and/or are communicatively coupled via any number, type(s) and/or combination of communication paths, communication networks, busses and/or communication devices 160.

While an example IMS-based VoIP communication system and an example IMS network 115 have been illustrated in FIG. 1, the devices, networks, systems, servers and/or processors illustrated in FIG. 1 may be combined, divided, re-arranged, eliminated and/or implemented in any way. For example, it will be readily appreciated by persons of ordinary skill in the art that the example application server 120, the example media server 125, the example S-CSCF server 135, the example ENUM server 140, the example P-CSCF server 145, the example I-CSCF server 150 and/or the example HSS 155 illustrated in FIG. 1 are logical entities of the example IMS network 115. They may, therefore, be implemented separately and/or in any combination using, for example, machine accessible instructions executed by one or more computing devices and/or computing platforms (e.g., the example processing platform 800 of FIG. 8). Further, the example VoIP device 105, the example application server 120, the example media server 125, the example S-CSCF server 135, the example ENUM server 140, the example P-CSCF server 145, the example I-CSCF server 150 and/or the example HSS 155 and/or, more generally, the example IMS network 115 may be implemented by hardware, software, firmware and/or any combination of hardware, software and/or firmware. Further still, the example IMS-based VoIP communication system and/or the example IMS network 115 may include additional devices, servers, systems, networks, gateways, portals, and/or processors in addition to, or instead of, those illustrated in FIG. 1, and/or may include more than one of any or all of the illustrated devices, servers, networks, systems, gateways, portals, and/or processors. For example, an IMS network 115 may include any number and/or type(s) of media gateways, media gateway control function (BGCF) servers, breakout gateway control function (BGCF) severs, soft switches, and/or session border controllers.

Figure 2:
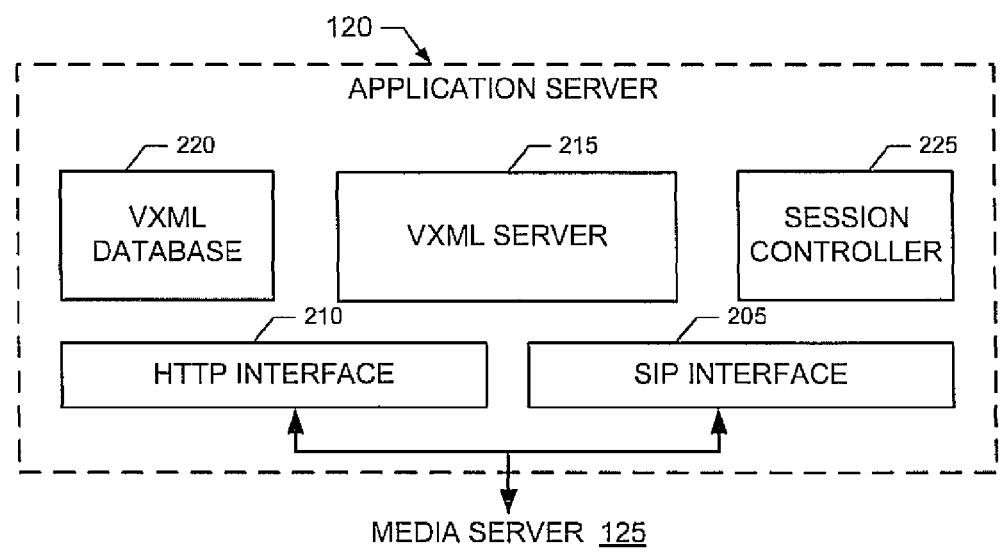
FIG. 2 illustrates an example manner of implementing the example application server of FIG. 1.

FIG. 2 illustrates an example manner of implementing the example application server 120 of FIG. 1. To receive and/or send SIP messages, the example application server 120 of FIG. 2 includes any type of SIP interface 205. The example SIP interface 205 of FIG. 2 allows the example application server 120 to exchange one or more SIP messages (e.g., a SIP INVITE message and/or a SIP REFER message) with one or more other devices, such as the example VoIP device 105 and/or the example media server 125 of FIG. 1.

To provide VXML content (e.g., VXML pages, data, code and/or instructions), the example application sever 120 of FIG. 2 includes an HTTP interface 210 and a VXML server 215. The example HTTP interface 210 of FIG. 2 receives content request messages (e.g., an HTTP GET protocol message) from media servers (e.g., the example media server 125 of FIG. 1). The example HTTP interface 210 also sends and/or provides VXML content to media servers via content messages (e.g., an HTTP 200 OK protocol message).

The example VXML server 215 of FIG. 2 processes a content request message received from a media server 125 via the example HTTP interface 210, and selects and/or identifies requested VXML content from a VXML content database 220 based on the received content request message. The example VXML server 215 directs the HTTP interface 210 to send the requested VXML content to the media server 125. The example VXML database 220 of FIG. 2 stores any number and/or type of VXML content (e.g., pages, code, instructions, data and/or information) using any number and/or type (s) of data structures. The example VXML database 220 may be stored and/or implemented by any number and/or type(s) of memory(-ies) and/or memory devices (not shown).

To detect the occurrence of events at the example application server 120 of FIG. 2, the application server 120 includes a session controller 225. Using any method(s), logic(s), variable(s), trigger(s) and/or condition(s), the example session controller 225 detects the occurrence of event(s) that necessitate(s) the interruption of executing VXML content. Any event that is detectable at and/or receivable by the application server 120 can be used to trigger the application server 120 to interrupt current VXML processing at the media server 125. Example events include, but are not limited to, the completion of a call transfer, and/or a SIP protocol message received at and/or processed by the application server 120 (e.g., DTMF signals can be provided to the application server 120 via a SIP INFO message and/or a SIP NOTIFY message). Events may also be detected via any other interface (e.g., internet message access protocol (IMAP), simple mail transfer protocol (SMTP), lightweight directory access protocol (LDAP), etc.) that is exposed at the application server 120. Another example interface is a web-services application programming interface (API) used to, for example, integrate the application server 120 with other platforms for portal integration and/or provisioning. For example, an action taken by a web-services client could in turn modify a mailbox that is currently being accessed and, thus, require the application server 120 to interrupt the current activity of the media server 125. When an event is detected by the example session controller 225 that necessitates the interruption of executing VXML content, the session controller 225 notifies the example VXML server 215. When notified by the example session controller 225, the example VXML server 215 of FIG. 2 selects replacement VXML content from the VXML database 220, and sends a VXML interrupt protocol message (e.g., a SIP REFER protocol message) to the media server 125 that is executing the VXML content to interrupt execution of the VXML content. An example VXML interrupt protocol message includes an HTTP URI (e.g., an HTTP uniform resource locator (URL)) for the replacement VXML content.

While an example manner of implementing the application server 120 of FIG. 1 has been illustrated in FIG. 2, one or more of the interfaces, data structures, elements, processes and/or devices illustrated in FIG. 2 may be combined, divided, re-arranged, omitted, eliminated and/or implemented in any other way. For example, the application server 120 may be implemented by modifying and/or enhancing a traditional and/or existing application server by the addition of one or more functions of the example HTTP interface 210, the example VXML server 215, the example VXML database 220 and/or the example session controller 225. Further, the SIP interface 205, the HTTP interface 210, the VXML server 215, the session controller 225 and/or, more generally, the application server 120 may be implemented by hardware, software, firmware and/or any combination of hardware, software and/or firmware. Further still, the example application server 120 may include interfaces, data structures, elements, processes and/or devices instead of, or in addition to, those illustrated in FIG. 2 and/or may include more than one of any or all of the illustrated interfaces, data structures, elements, processes and/or devices.

Figure 3:
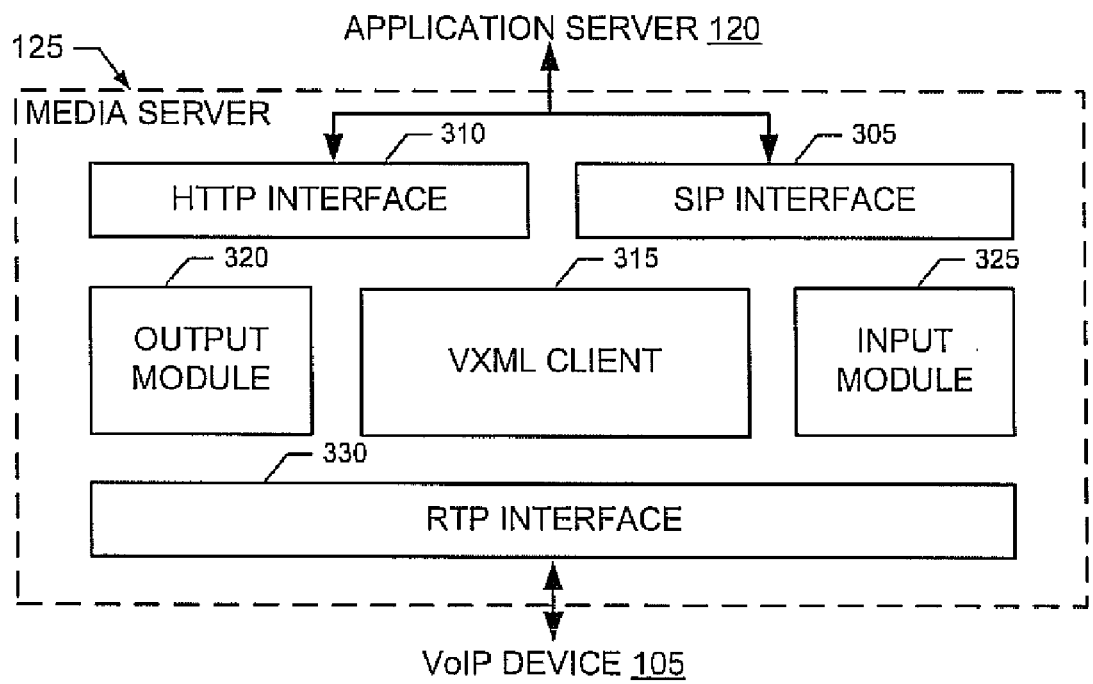
FIG. 3 illustrates an example manner of implementing the example media server of FIG. 1.

FIG. 3 illustrates an example manner of implementing the example media server 125 of FIG. 1. To receive and/or send SIP messages, the example media server 125 of FIG. 3 includes any type of SIP interface 305. The example SIP interface 305 of FIG. 3 allows the example media server 125 to exchange one or more SIP messages (e.g., a SIP INVITE message and/or a SIP REFER message) with one or more other devices, such as the example application server 120 of FIG. 1.

To obtain VXML content (e.g., VXML pages, data, code and/or instructions), the example media server 125 of FIG. 3 includes an HTTP interface 310 and a VXML client 315. To request VXML content, the example HTTP interface 310 of FIG. 3 sends content request messages (e.g., an HTTP GET protocol message) to an application server 120. The example HTTP interface 310 also receives VXML content from the application server 120 via content messages (e.g., an HTTP 200 OK protocol message).

The example VXML client 315 of FIG. 3 processes protocol messages (e.g., a SIP INVITE message and/or a SIP REFER message) received from an application server 120 via the SIP interface 305. Based on the VXML content identified by a received protocol message, the example VXML client 315 requests (e.g., by sending an HTTP GET protocol message to the application server 120), and obtains VXML content (e.g., by receiving an HTTP 200 OK protocol message from the application server 120) via the example HTTP interface 310. If the received protocol message is a VXML execution interruption message (e.g., a SIP REFER message), the example VXML client 315 of FIG. 3 a) interrupts the currently executing VXML content, b) identifies the replacement VXML content based on the interruption message, c) requests (e.g., by sending an HTTP GET protocol message) and obtains (e.g., by receiving an HTTP 200 OK protocol message) the replacement VXML content from the application server 120 via the HTTP interface 310, and d) begins executing the replacement VXML content.

To execute VXML content, the example media server 125 of FIG. 3 includes one or more output modules (one of which is designated at reference numeral 320), and one or more input modules (one of which is designated at reference numeral 325). In addition to processing VXML interrupt protocol messages, requesting VXML content, and/or obtaining VXML content, the example VXML client 315 of FIG. 3 also interprets VXML content (e.g., page(s), code, script(s), instruction(s), data and/or information) using any method(s), logic and/or algorithm(s). Based on received VXML content, the example VXML client 315 directs the operation of the example output module 320 and/or the example input module 325 to execute the VXML content. Example output modules 320 include, but are not limited to, an audio codec, a video codec, an audio playback module, a video playback module and/or a speech synthesis module. Example input modules 325 include, but are not limited to, an audio codec, an audio recording module, a speech recognition module and/or a DTMF decoder.

To exchange audio data with a VoIP device 105, the example media server 125 of FIG. 3 includes an RTP interface 330. Using any method(s), logic, message(s) and/or protocol(s), the example RTP interface 330 sends real-time audio data generated by the example output module 320 to the VoIP device 105 and receives real-time audio data from the VoIP device 105 for processing by the example input module 325.

While an example manner of implementing the media server 125 of FIG. 1 has been illustrated in FIG. 3, one or more of the interfaces, data structures, elements, processes and/or devices illustrated in FIG. 3 may be combined, divided, re-arranged, omitted, eliminated and/or implemented in any other way. For example, the media server 125 may be implemented by modifying and/or enhancing a traditional and/or existing media server by the addition of one or more functions of the example HTTP interface 310, the example VXML client 315, the example output module 320, and/or the example input module 325. Further, the SIP interface 305, the HTTP interface 310, the VXML client 315, the output module 320, the input module 325, the RTP interface 330 and/or, more generally, the media server 125 may be implemented by hardware, software, firmware and/or any combination of hardware, software and/or firmware. Further still, the example media server 125 may include interfaces, data structures, elements, processes and/or devices instead of, or in addition to, those illustrated in FIG. 3 and/or may include more than one of any or all of the illustrated interfaces, data structures, elements, processes and/or devices.

Figure 4:
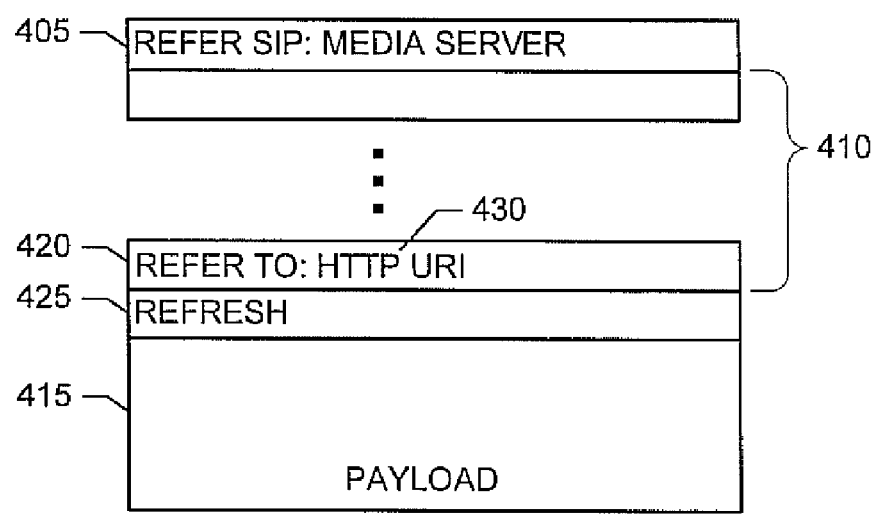
FIG. 4 illustrates an example data structure that may be used by an application server to interrupt execution of voice eXtensible Markup Language (VXML) content at a media server.

FIG. 4 illustrates an example data structure that may be sent by an application server 120 to interrupt the execution of VXML content by a media server 125. The example data structure of FIG. 4 is constructed in accordance with a VoIP protocol message, such as a SIP REFER message. However, any type of protocol message may be used by an application server 120 to interrupt the execution of VXML content by a media server 125.

To identify the SIP message, the example data structure of FIG. 4 includes a name field 405. The example name field 405 of FIG. 4 includes an alphanumeric string that identifies the SIP message and identifies a destination for the example message. The example SIP message illustrated in FIG. 4 is a SIP REFER message and, thus, the example name field 405 contains a string that includes "REFER SIP:" In the illustrated example data structure, the SIP message is addressed to the media server 125 executing the VXML content that is to be interrupted. The name field 405 could alternatively or additionally be used to identify other types of SIP messages and/or other destinations.

To provide additional values and/or parameters, the example data structure of FIG. 4 includes one or more header fields 410. Example header fields 410 include, but are not limited to, a from field, a call identification field, a command sequence number field, and/or payload length field. The number of header fields 410, in some examples, depends upon the type of SIP message and/or the protocol(s) implemented by either endpoint. To convey and/or carry any number and/or type(s) of additional data and/or information, the example data structure of FIG. 4 may include a payload 415.

To interrupt the execution of VXML content and to specify replacement VXML content, the example header fields 410 of FIG. 4 include a refer-to field 420 and a refresh field 425. The example refer-to field 420 of FIG. 4 contains an embedded string 430 that specifies a HTTP URI (e.g., an HTTP URL) for the replacement VXML content. The example refresh field 425 of FIG. 4 contains a string that includes "REFRESH" to cause the media server 125 that receives the example SIP message of FIG. 4 to interrupt currently executing VXML content, and then request, obtain and begin executing the replacement VXML content identified in the refer-to field 420.

While an example data structure is illustrated in FIG. 4, the example data structures may be implemented using any number and/or type(s) of other and/or additional fields and/or data. Further, the fields and/or data illustrated in FIG. 4 may be combined, divided, re-arranged, eliminated and/or implemented in any desired manner. Moreover, the example data structures may include fields and/or data in addition to, or instead of, those illustrated in FIG. 4, and/or may include more than one of any or all of the illustrated fields and/or data.

Figure 5:
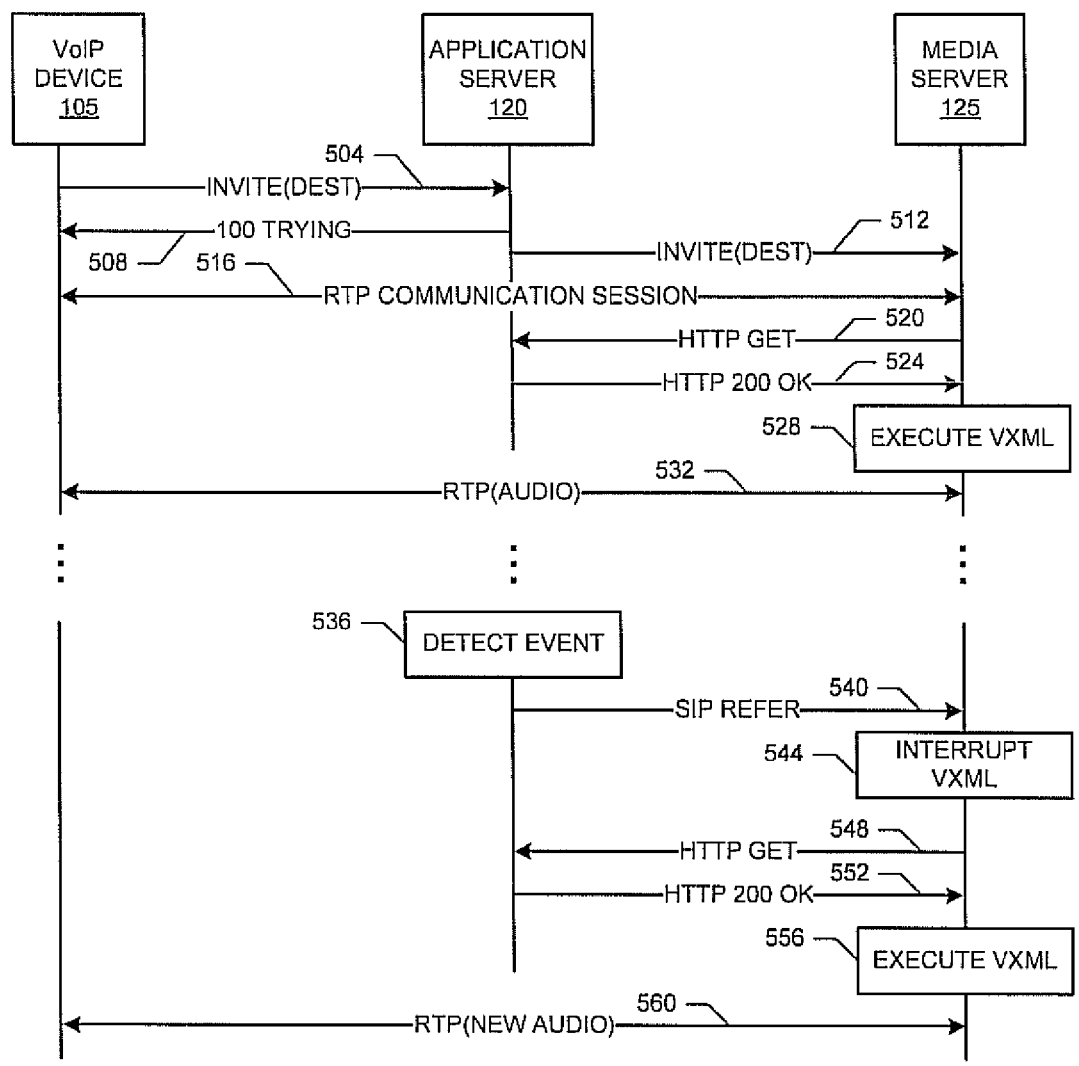
FIG. 5 illustrates example protocol message exchanges and flowcharts representative of machine accessible instructions that may be executed to implement any or all of the example application servers, the example media servers and/or, more generally, the example IMS network of FIGS. 1-3.

FIG. 5 illustrates example protocol message exchanges, and/or flowcharts representative of example machine accessible instructions that may be executed to implement any or all of the example VoIP device 105, the example application servers 120, the example media servers 125 and/or, more generally, the example IMS network 115 of FIGS. 1-3. The example exchanges and/or the example machine accessible instructions of FIG. 5 may be carried out by one or more processor(s), controller(s) and/or any other suitable processing device(s). For example, the example exchanges and/or the example machine accessible instructions of FIG. 5 may be embodied in coded instructions stored on a tangible medium such as a flash memory, a read-only memory (ROM) and/or random-access memory (RAM) associated with a processor (e.g., the example processor 805 discussed below in connection with FIG. 8). Alternatively, some or all of the example exchanges and/or the example machine accessible instructions of FIG. 5 may be implemented using any combination(s) of application specific integrated circuit(s) (ASIC(s)), programmable logic device(s) (PLD(s)), field programmable logic device(s) (FPLD(s)), discrete logic, hardware, firmware, software, etc. Also, some or all of the example exchanges and/or the example machine accessible instructions of FIG. 5 may be implemented manually or as any combination(s) of any of the foregoing techniques, for example, as any combination of firmware, software, discrete logic and/or hardware. Persons of ordinary skill in the art will readily appreciate that many other methods of implementing any or all of the example VoIP device 105, the example application servers 120, the example media servers 125 and/ or, more generally, the example IMS network 115 of FIGS. 1-3 may be employed. For example, the order of execution of the blocks of the example flowcharts and/or the example exchanges of FIG. 5 may be changed, and/or some of the blocks and/or exchanges described may be changed, eliminated, sub-divided, and/or combined. Additionally, persons of ordinary skill in the art will appreciate that any or all of the example exchanges and/or the example machine accessible instructions of FIG. 5 may be carried out sequentially and/or carried out in parallel by, for example, separate processing threads, processors, devices, discrete logic, circuits, etc.

For ease of illustration and discussion, intervening devices, servers and/or networks of the example IMS-based VoIP communication system of FIG. 1 are not depicted in FIG. 5. Persons of ordinary skill in the art will readily appreciate that, for example, a VoIP device 105 does not directly exchange protocol messages with an application server 120. Instead such protocol messages are exchanged between the VoIP device 105 and the application server via one or more call session control function servers, access networks and/or IP networks.

The example protocol message exchanges of FIG. 5 begin with a VoIP device (e.g., the example VoIP device 105 of FIG. 1) sending a SIP INVITE message 504 to an application server (e.g., any of the example application servers 120 of FIGS. 1 and/or 2). In response to the SIP INVITE message 504, the application server 120 responds to the VoIP device 105 with a SIP 100 TRYING message 508 and sends a SIP INVITE message 512 to a media server (e.g., the example media server 125 of FIGS. 1 and/or 3). The example VoIP device 105 and the example media server 125 then establish an RTP communication session 516 for a voice dialog communication session.

Based on one or more parameters (e.g., an HTTP URI) contained in the SIP INVITE message 512, the example media server 125 sends an HTTP GET protocol message 520 to the application server 120 to request the VXML content associated with the HTTP URI. The example application server 120 responds to the HTTP GET message 520 by sending the requested VXML content to the media server 125 via an HTTP 200 OK protocol message 524. When the VXML content is received, the media server 125 (e.g., the example VXML client 315, the example output module 320 and/or the example input module 325 of FIG. 3) begins executing the received VXML content (block 528). As specified by the received VXML content, audio data 532 is exchanged between the media server 125 and the VoIP device 105 via the RTP communication session.

When an occurrence of an event that necessitates the interruption of executing VXML content by the media server 125 is detected at the application server 120 (block 536), the example application server 120 sends a SIP REFER message 540 (e.g., the example SIP REFER message of FIG. 4) to interrupt the execution of the VXML content and to identify replacement VXML content. In response to the SIP REFER message 540, the example media server 125 interrupts execution of the VXML content (block 544) and requests the replacement VXML content by sending an HTTP GET protocol message 548 to the application server 120.

The example application server 120 responds to the HTTP GET message 548 by sending the requested replacement VXML content to the media server 125 via an HTTP 200 OK protocol message 552. When the VXML content is received, the media server 125 (e.g., the example VXML client 315, the example output module 320 and/or the example input module 325 of FIG. 3) begins executing the received replacement VXML content (block 556). As specified by the received VXML content, different audio data 560 is exchanged between the media server 125 and the VoIP device 105 via the RTP communication session.

Figure 6:
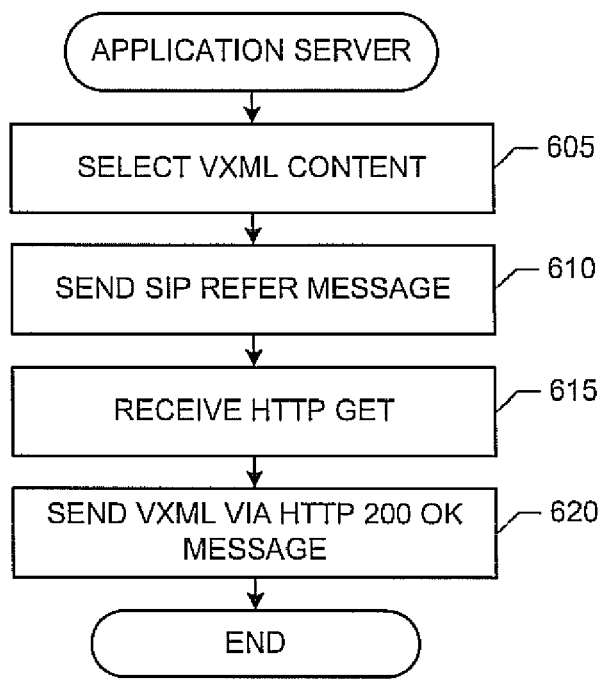
FIG. 6 is a flowchart representative of example machine accessible instructions that may be executed to implement any or all of the example application servers of FIGS. 1 and/or 2.
Figure 7:
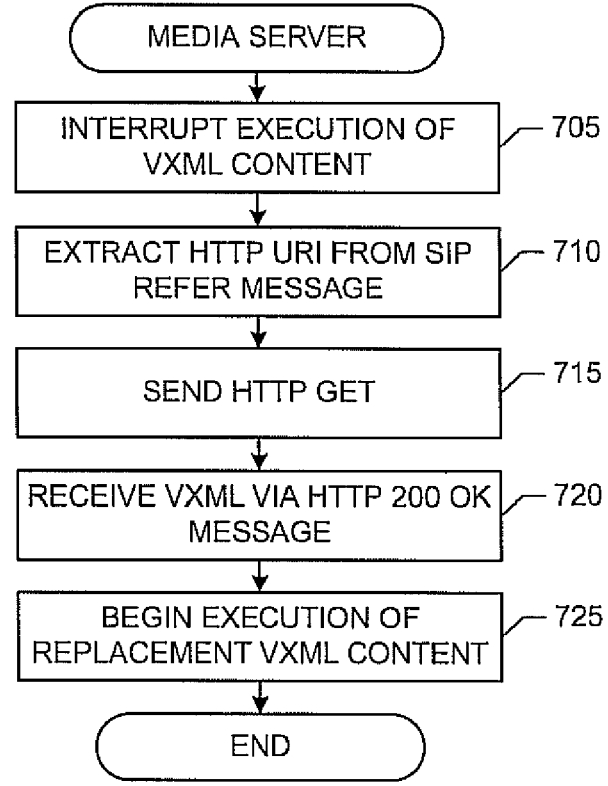
FIG. 7 is a flowchart representative of example machine accessible instructions that may be executed to implement any or all of the example media servers of FIGS. 1 and/or 3.

FIG. 6 illustrates example machine accessible instructions that may be executed to implement any or all of the example application servers 120 of FIGS. 1 and/or 2. FIG. 7 illustrates example machine accessible instructions that may be executed to implement any or all of the example media servers 125 of FIGS. 1 and/or 2. The example machine accessible instructions of FIGS. 6 and/or 7 may be carried out by a processor, a controller and/or any other suitable processing device. For example, the example machine accessible instructions of FIGS. 6 and/or 7 may be embodied in coded instructions stored on a tangible medium such as a flash memory, a ROM and/or RAM associated with a processor (e.g., the example processor 805 discussed below in connection with FIG. 8). Alternatively, some or all of the example machine accessible instructions of FIGS. 6 and/or 7 may be implemented using any combination(s) of ASIC(s), PLD(s), FPLD(s), discrete logic, hardware, firmware, etc. Also, some or all of the example machine accessible instructions of FIGS. 6 and/or 7 may be implemented manually or as any combination of any of the foregoing techniques, for example, any combination of firmware, software, discrete logic and/or hardware. Further, although the example machine accessible instructions are described with reference to the flowcharts of FIGS. 6 and/ 7, persons of ordinary skill in the art will readily appreciate that many other methods of implementing the machine accessible instructions of FIGS. 6 and 7 may be employed. For example, the order of execution of the blocks may be changed, and/or one or more of the blocks described may be changed, eliminated, sub-divided, or combined. Additionally, persons of ordinary skill in the art will appreciate that any or all of the example machine accessible instructions of FIGS. 6 and/or 7 may be carried out sequentially and/or carried out in parallel by, for example, separate processing threads, processors, devices, discrete logic, circuits, etc.

The machine accessible instructions of FIG. 6 begin when an application server (e.g., any of the example application servers 120 of FIGS. 1 and/or 2 and/or, more specifically, the example session controller 225 of FIG. 2) detects an event that necessitates the interruption of VXML content being executed by a media server (e.g., any of the example media servers 125 of FIGS. 1 and/or 3). The application server (e.g., the example VXML server 215) identifies the event and selects replacement VXML content from, for example, the example VXML database 220 (block 605).

The application server (e.g., the example SIP interface 205 of FIG. 2) sends a SIP REFER message to the media server to interrupt execution of the executing VXML content and to identify the replacement VXML content to the media server (block 610). When the application server (e.g., the example HTTP interface 210) receives an HTTP GET message for the replacement VXML content from the media server (block 615), the HTTP interface returns the VXML content to the media server via an HTTP 200 OK message (block 620). Control then exits from the example machine accessible instructions of FIG. 6.

The example machine accessible instructions of FIG. 7 begin when a media server (e.g., any of the example media servers 125 of FIGS. 1 and/or 3 and/or, more specifically, the example SIP interface 305) receives a SIP REFER message from an application server (e.g., any of the example application servers 120 of FIGS. 1 and/or 2). The media server (e.g., the example VXML client 315) interrupts the execution of currently executing VXML content (block 705) and extracts the HTTP URI for replacement VXML content from the SIP REFER message (block 710).

The media server (e.g., the example HTTP interface 310) sends an HTTP GET message to the application server to request the replacement VXML content (block 715) and receives the replacement VXML content via an HTTP 200 OK message (block 720). The media server (e.g., the example VXML client 315, the example output module 320, the example input module 325 and/or the example RTP interface 330) begins executing the received replacement VXML content (block 725). Control then exits from the example machine accessible instructions of FIG. 7.

Figure 8:
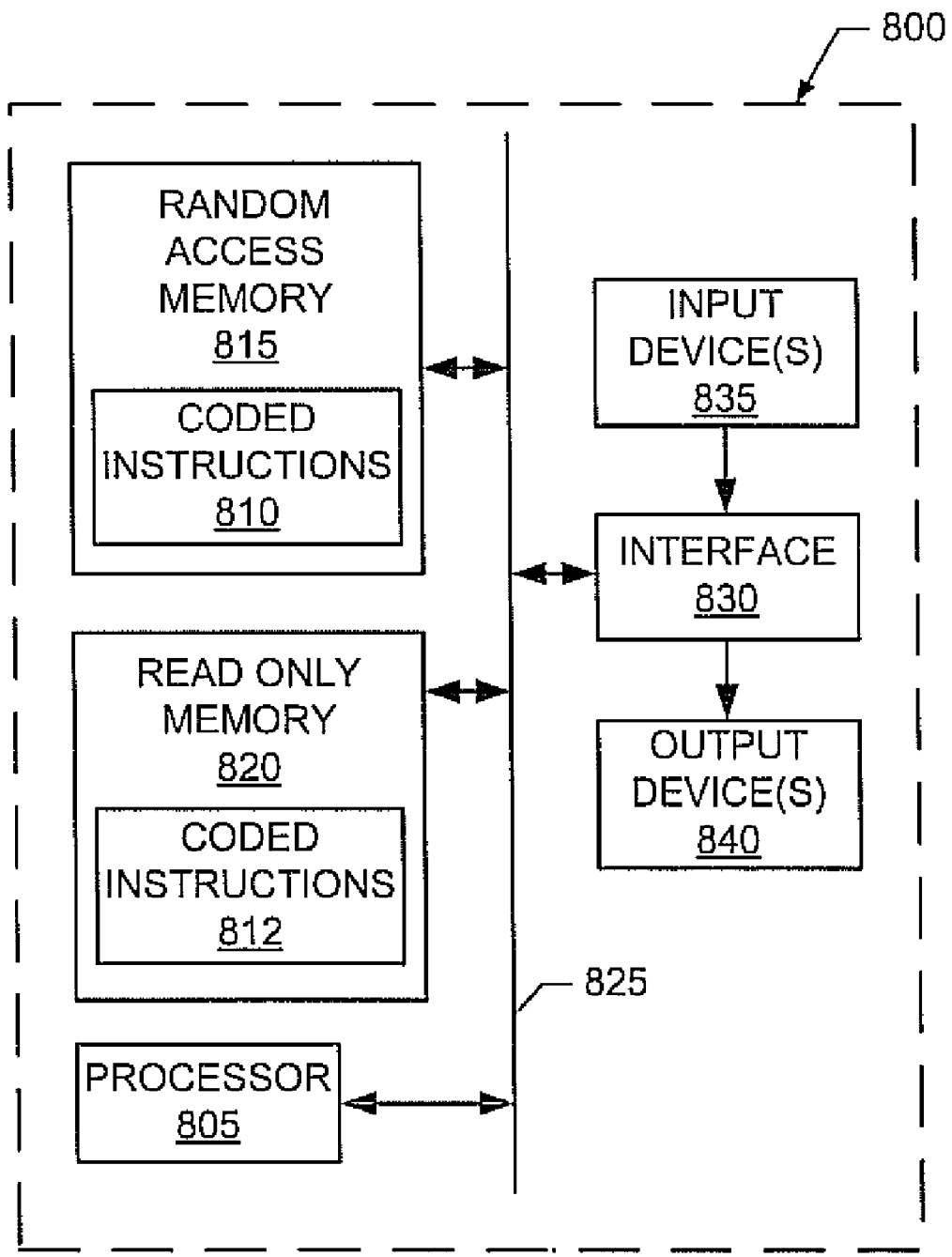
FIG. 8 is a schematic illustration of an example processor platform that may be used and/or programmed to carry out the example message exchanges and/or the example machine accessible instructions of FIGS. 5, 6 and/or 7 to implement any of all of the example methods and apparatus described herein.

FIG. 8 is a schematic diagram of an example processor platform 800 that may be used and/or programmed to implement all or a portion of any or all of the example application servers 120, the example media servers 125 and/or, more generally, the example IMS network 115 of FIGS. 1-3. For example, the processor platform 800 can be implemented by one or more general purpose processors, processor cores, microcontrollers, etc.

The processor platform 800 of the example of FIG. 8 includes at least one general purpose programmable processor 805. The processor 805 executes coded instructions 810 and/or 812 present in main memory of the processor 805 (e.g., within a RAM 815 and/or a ROM 820). The processor 805 may be any type of processing unit, such as a processor core, a processor and/or a microcontroller. The processor 805 may execute, among other things, the example protocol message exchanges and/or the example machine accessible instructions of FIGS. 5, 6 and/or 7 to implement the example methods and apparatus described herein.

The processor 805 is in communication with the main memory (including a ROM 820 and/or the RAM 815) via a bus 825. The RAM 815 may be implemented by DRAM, SDRAM, and/or any other type of RAM device, and ROM may be implemented by flash memory and/or any other desired type of memory device. Access to the memory 815 and 820 may be controlled by a memory controller (not shown). The memory 815 and/or 820 may be used to implement the example VXML database 220 of FIG. 2.

The processor platform 800 also includes an interface circuit 830. The interface circuit 830 may be implemented by any type of interface standard, such as an external memory interface, serial port, general purpose input/output, etc. One or more input devices 835 and one or more output devices 840 are connected to the interface circuit 830. The input devices 835 and/or output devices 840 may be used to, for example, implement the example SIP interface 205 and/or the example HTTP interface 210 of FIG. 2, and/or the example SIP interface 305, the example HTTP interface 310 and/or the example RTP interface 330 of FIG. 3.

Of course, persons of ordinary skill in the art will recognize that the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of the invention are not limited to such devices, standards and/or protocols. Such systems are periodically superseded by faster or more efficient systems having the same general purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An application server comprising:
    a first interface to provide first and second voice eXtensible Markup Language (VXML) content to a media server;
    a second interface to send a first protocol message to the media server to initiate a communication session between the media server and a user endpoint device, the media server to provide the first VXML content to the user endpoint device via the communication session; and
    a session controller including a processor programmed to detect an event at the application server and to, in response to the detected event, direct the second interface to send a second protocol message to the media server, wherein the second protocol message comprises a session initiation protocol (SIP) REFER message containing a REFRESH field, the REFRESH field comprising a first value to direct the media server to terminate providing the first VXML content to the user endpoint device via the communication session and to direct the media server to obtain the second VXML content from the application server and provide the second VXML content to the same user endpoint device via the same communication session.

2. An application server as defined in claim 1, further comprising:
    a VXML server to provide the first and the second VXML content to the media server via the first interface; and
    a VXML database to store the first and second VXML content.

3. An application server as defined in claim 1, wherein the communication session comprises a real-time transfer protocol (RTP) communication session.

4. An application server as defined in claim 1, wherein the first protocol message comprises a SIP INVITE message.

5. An application server as defined in claim 1, wherein the SIP REFER message comprises a hyper-text transfer protocol (HTTP) uniform resource identifier (URI) for the second VXML content.

6. An application server as defined in claim 1, wherein the SIP REFER message comprises a REFER-TO field.

7. An application server as defined in claim 1, wherein the first VXML content is associated with music on hold, and wherein the second VXML content comprises instructions to direct the media server to connect the user endpoint device to a transfer target.

8. An application server as defined in claim 1, wherein the second interface comprises a SIP interface.

9. A method comprising:
    providing first and second voice eXtensible Markup Language (VXML) content from an application server to a media server;
    sending a first protocol message from the application server to the media server to direct the media server to provide the first VXML content to a user endpoint via a communication session;
    detecting an occurrence of an event at the application server; and
    sending a session initiation protocol (SIP) REFER message containing a REFRESH field from the application server to the media server, the REFRESH field comprising a first value to direct the media server to terminate providing the first VXML content to the user endpoint via the communication session and to direct the media server to provide the second VXML content to the same user endpoint device via the same communication session.

10. A method as defined in claim 9, wherein the first message comprises a SIP INVITE message that includes a hyper-text transfer protocol (HTTP) uniform resource identifier (URI) for the first VXML content.

11. A method as defined in claim 9, wherein the SIP REFER message that includes a hyper-text transfer protocol (HTTP) uniform resource identifier (URI) for the second VXML content.

12. A method as defined in claim 9, wherein the first VXML content is associated with music on hold, and wherein the event is associated with completion of a call transfer.

13. A tangible article of manufacture storing machine readable instructions which, when executed, cause a machine to:
    provide first and second voice eXtensible Markup Language (VXML) content from an application server to a media server;
    send a first protocol message from the application server to the media server to direct the media server to provide the first VXML content to a user endpoint via a communication session;

detect an occurrence of an event at the application server; and send from the application server a session initiation protocol (SIP) REFER message containing a REFRESH field to the media server, the REFRESH field comprising a first value to direct the media server to terminate providing the first VXML content to the user endpoint via the communication session and to direct the media server to provide the second VXML content to the same user endpoint device via the same communication session.

14. A tangible article of manufacture as defined in claim 13, wherein the first message comprises a SIP INVITE message, and the machine readable instructions, when executed, cause the machine to insert a hyper-text transfer protocol (HTTP) uniform resource identifier (URI) for the first VXML content into the SIP INVITE message.

15. A tangible article of manufacture as defined in claim 13, wherein the machine readable instructions, when executed, cause the machine to include a hyper-text transfer protocol (HTTP) uniform resource identifier (URI) for the second VXML content in the SIP REFER message.

16. A tangible article of manufacture as defined in claim 13, wherein the first VXML content is associated with music on hold, and wherein the event is associated with completion of a call transfer.

* * * * *